US006752655B1

(12) United States Patent
Kaczmarek

(10) Patent No.: US 6,752,655 B1
(45) Date of Patent: Jun. 22, 2004

(54) METHOD AND STRUCTURE FOR FIXING A LOCKING CONNECTOR TO A VEHICLE MEMBER

(75) Inventor: Brian Kaczmarek, Royal Oak, MI (US)

(73) Assignee: Textron Automotive Company Inc., Troy, MI (US)

( * ) Notice: Subject to any disclaimer, the term of this patent is extended or adjusted under 35 U.S.C. 154(b) by 0 days.

(21) Appl. No.: 09/570,316

(22) Filed: May 12, 2000

(51) Int. Cl.$^7$ ................................................ H01R 13/73
(52) U.S. Cl. .................. 439/546; 439/34; 439/569; 439/364; 439/680; 439/699.2; 29/858; 296/146.7
(58) Field of Search .................... 439/546, 34, 680, 439/547, 550, 562, 569, 571, 364, 699.2; 296/146.7; 29/858, 550, 563, 545, 569

(56) References Cited

U.S. PATENT DOCUMENTS

| 833,342 | A | | 10/1906 | Salisbury |
| 966,966 | A | | 8/1910 | Tregoning |
| 3,732,525 | A | * | 5/1973 | Henschen et al. ............ 339/49 |
| 4,152,622 | A | * | 5/1979 | Fitzgerald .............. 313/318.09 |
| 4,761,144 | A | * | 8/1988 | Hunt, III et al. ............. 439/545 |
| 4,824,164 | A | | 4/1989 | Nakayama et al. ......... 296/146 |
| 4,862,011 | A | | 8/1989 | Wright ....................... 307/10.1 |
| 4,941,258 | A | | 7/1990 | Wright ......................... 29/858 |
| 5,248,259 | A | * | 9/1993 | Naito et al. .................... 439/34 |
| 5,279,507 | A | | 1/1994 | Kameyama ................. 439/552 |
| 5,487,680 | A | | 1/1996 | Yamanashi .................. 439/552 |
| 5,621,328 | A | | 4/1997 | Yamanashi .................. 324/538 |
| 5,735,041 | A | | 4/1998 | Zaguskin et al. ............. 29/857 |
| 5,743,010 | A | | 4/1998 | Zaguskin et al. ............. 29/857 |
| 5,879,047 | A | | 3/1999 | Yamaguchi et al. ...... 296/146.7 |
| 5,884,961 | A | | 3/1999 | Serizawa et al. ......... 296/146.7 |
| 5,895,295 | A | * | 4/1999 | Harada ..................... 439/699.2 |
| 5,932,846 | A | | 8/1999 | Zaguskin et al. ........... 174/170 |
| 5,984,721 | A | | 11/1999 | Self, Jr. et al. ............. 439/546 |
| 6,000,959 | A | | 12/1999 | Curtindale et al. ......... 439/247 |
| 6,083,054 | A | * | 7/2000 | Suzuki et al. ............ 439/699.2 |
| 6,540,385 | B2 | * | 4/2003 | Ikeda et al. ................. 362/512 |

FOREIGN PATENT DOCUMENTS

| DE | 195 28 572 | 2/1996 | |
| EP | 901 195 | 3/1999 | ......... H01R/13/627 |

* cited by examiner

*Primary Examiner*—Truc Nguyen
(74) *Attorney, Agent, or Firm*—Grossman, Tucker, Perreault & Pfleger, PLLC

(57) ABSTRACT

A structure for fixing a connector to a vehicle member comprising a connector, a wall provided within said vehicle including a connector fixing hole for engaging the connector, the connector comprising a first locking piece and a second locking piece and a region therebetween. The first locking piece and the second locking piece are attached to the connector and releasably engage a portion of the wall of the vehicle member at the region between the first and second locking pieces. The method includes the steps of inserting the first connector from an inner side of the vehicle member into the connector fixing hole and partially penetrating the connector fixing hole to an outer side of the vehicle member, rotating the first connector while the first connector is located in the connector fixing hole, engaging a portion of the vehicle member at the region between a first locking piece and second locking piece of the first connector such that the first connector is prevented from generally perpendicular removal from the connector fixing hole, and coupling the first connector with the second connector.

9 Claims, 7 Drawing Sheets

METHOD AND STRUCTURE FOR FIXING A LOCKING CONNECTOR TO A VEHICLE MEMBER

FIELD OF THE INVENTION

The present invention relates to an interconnection of wire harnesses for use in vehicles and, more particularly, to a connector used for interconnecting wire harnesses at the door portion of an automobile.

BACKGROUND OF THE INVENTION

FIGS. 1 to 3 show a conventional structure for interconnecting wire harnesses at automotive door portions by using connectors, wherein in FIG. 1, a door b which is fitted to a vehicle body with hinges and contains a door side wire harness Wb disposed therein and extended therefrom to be coupled with a vehicle body side wire harness Wa by way of a connector at the connector fixing hole formed in a vehicle body panel P. FIG. 2 shows a female connector C1 attached to a vehicle body side wire harness Wa and a male connector C2 attached to a door side wire harness Wb, respectively made of synthetic resin, wherein the door side wire harness Wb further contains a rubber-made waterproof protecting grommet g in such a way that the male connector C2 is entirely covered thereby from its rear side. In this situation, the grommet g can be recognized from outside as shown in FIG. 1.

The female connector C1 attached to the vehicle body side wire harness Wa is formed with a plurality of resilient locking pieces e which are constructed by the slits d and each having a locking projection f at the free end thereof, and also formed, with stoppers h respectively keeping a certain distance from the locking projections f.

As shown in FIG. 3, the female connector C1 attached to the vehicle body side wire harness Wa is fitted into a connector fixing hole P1 of the vehicle body panel P from the inner body side (the right side of FIG. 3), wherein when the female connector C1 is pushed and inserted into the connector fixing hole P1, the resilient locking pieces e are first inwardly deflected and gradually moved forward through, the connector fixing hole P1, and thereafter, when the stoppers h are abutted to the inner surface of the vehicle body panel P, the resilient locking pieces e are resiliently returned to the original positions thereof, so that the locking projections f are latched at the outside surface of the panel P and the female connector C1 is thus fixed to the, body panel P.

By this preliminary arrangement, the male connector C2 attached to the vehicle door side wire harness Wb is mated with the female connector C1 and locked by way of a known locking mechanism (not shown) which is normally situated at the middle portion of the connector, whereby the grommet g is firmly attached to the outside surface of the body panel P to function as its water-proof device.

However, with the construction above, it has been suggested that if the female connector C1 is in such an unstable condition that a plurality of locking pieces e thereof are not perfectly fitted into the connector fixing hole P1 of the body panel P, it is likely to come off from the panel :P when coupling it with the male connector C2, and in such an already advanced preparatory stage, it is quite troublesome to correctly fix the male connector C1 to the panel P from inner side of the vehicle body.

As constructed above, the use of resilient locking pieces which first inwardly deflect and return to their original position after passing through a connector fixing hole) typically suffer from numerous problems. First, resilient locking pieces may be prone to break during deflection and engagement with the connector fixing hole, and may be difficult to disengage during future vehicle service without breakage. Also, where multiple resilient locking pieces are used, it may be difficult to ensure that all resilient locking pieces are engaged and properly seated during manufacturing inspection Consequently, if not properly seated, the connector may become dislodged during use. Furthermore, resilient locking pieces generally do not compensate for variations in substrate thickness. Thus, for example, if the substrate is too thick the resilient locking pieces may not engage properly. Conversely, if the substrate is too thin the resilient locking pieces may engage, but allow the connector to rattle during vehicle use. Also, resilient locking pieces generally do not offer significant removal force in the direction opposite of engagement. Lastly, resilient locking pieces do not offer adequate load bearing surface area to prevent rocking of the connector in the connector fixing hole. Thus, the connection between the connectors may become unstable during use. What is need is a structure and a method for fixing a connector to a vehicle which addresses the aforementioned problems.

SUMMARY OF THE INVENTION

In a first aspect, the present invention relates to a method for coupling a first connector which is attached to a first wire harness with a second connector which is attached to a second wire harness at a connector fixing hole formed in a vehicle member. The method comprises the steps of inserting the first connector into the connector fixing hole and partially penetrating the connector fixing hole. The first connector comprises a first locking piece and a second locking piece and a region therebetween. The first connector is then positioned in the connector fixing hole such that the first connector engages a portion of the vehicle member at said region between said first locking piece and second locking piece such that the first connector is prevented from generally perpendicular removal from the connector fixing hole.

According to another aspect the invention relates a method for coupling a first connector which is attached to a first wire harness with a second connector which is attached to a second wire harness at a connector fixing hole formed in a vehicle member is provided. The method comprises the steps of inserting the first connector from an inner side of the vehicle member to the connector fixing hole and partially penetrating the connector fixing hole to an outer side of the vehicle member, rotating the first connector while the first connector is located in the connector fixing hole, engaging a portion of the vehicle member between a first locking piece and second locking piece of the first connector such that the first connector is prevented from free removal from the connector fixing hole, and coupling the first connector with the second connector.

According to another aspect the invention relates to the method of coupling a first connector which is attached to a first wire harness with a second connector which is attached to a second wire harness at a connector fixing hole formed in a vehicle member and further comprises the steps of providing the first connector from a fixed location on the inner side of the vehicle member, and removing the first connector from the fixed location prior to rotating the first connector while the first connector is located in the connector fixing hole.

According to another aspect the invention relates to a structure for fixing a connector to a vehicle member comprising a connector, a wall provided within said vehicle including a connector fixing hole for engaging said connector to said connector fixing hole. The connector comprises a first locking piece and a second locking piece and a region therebetween wherein the first locking piece and the second locking piece are attached to the connector and engage a portion of the wall of the vehicle member at the region between said first locking piece and said second locking piece.

According to another aspect the invention relates to a structure for coupling two connectors for use in a vehicle. The structure comprises a first connector attached to a first wire harness, a second connector attached to a second wire harness, and a wall provided with a vehicle member for fixing the first connector to a connector fixing hole formed in the vehicle member. The first connector comprises a first locking piece and a second locking piece and a region therebetween wherein the first locking piece and the second locking piece are attached to the first connector and engage a portion of the wall of the vehicle member at said region between the first locking piece and the second locking piece without deflection of either the first locking piece or the second locking piece.

According to another aspect of the invention, the first wire harness further comprises a door side wire harness and the second wire harness further comprises a vehicle body side wire harness.

According to another aspect of the invention, the first wire harness further comprises a vehicle body side wire harness and the second wire harness further comprises a door side wire harness.

According to another aspect of the invention, the vehicle member further comprises the vehicle body, vehicle door, or vehicle pillar.

BRIEF DESCRIPTION OF THE DRAWINGS

To better understand and appreciate the invention, refer to the following detailed description in connection with the accompanying drawings.

DESCRIPTION OF THE PREFERRED EMBODIMENT

A preferred structure and method of the present invention will now be described with reference to the accompanying drawings.

Figure 1:
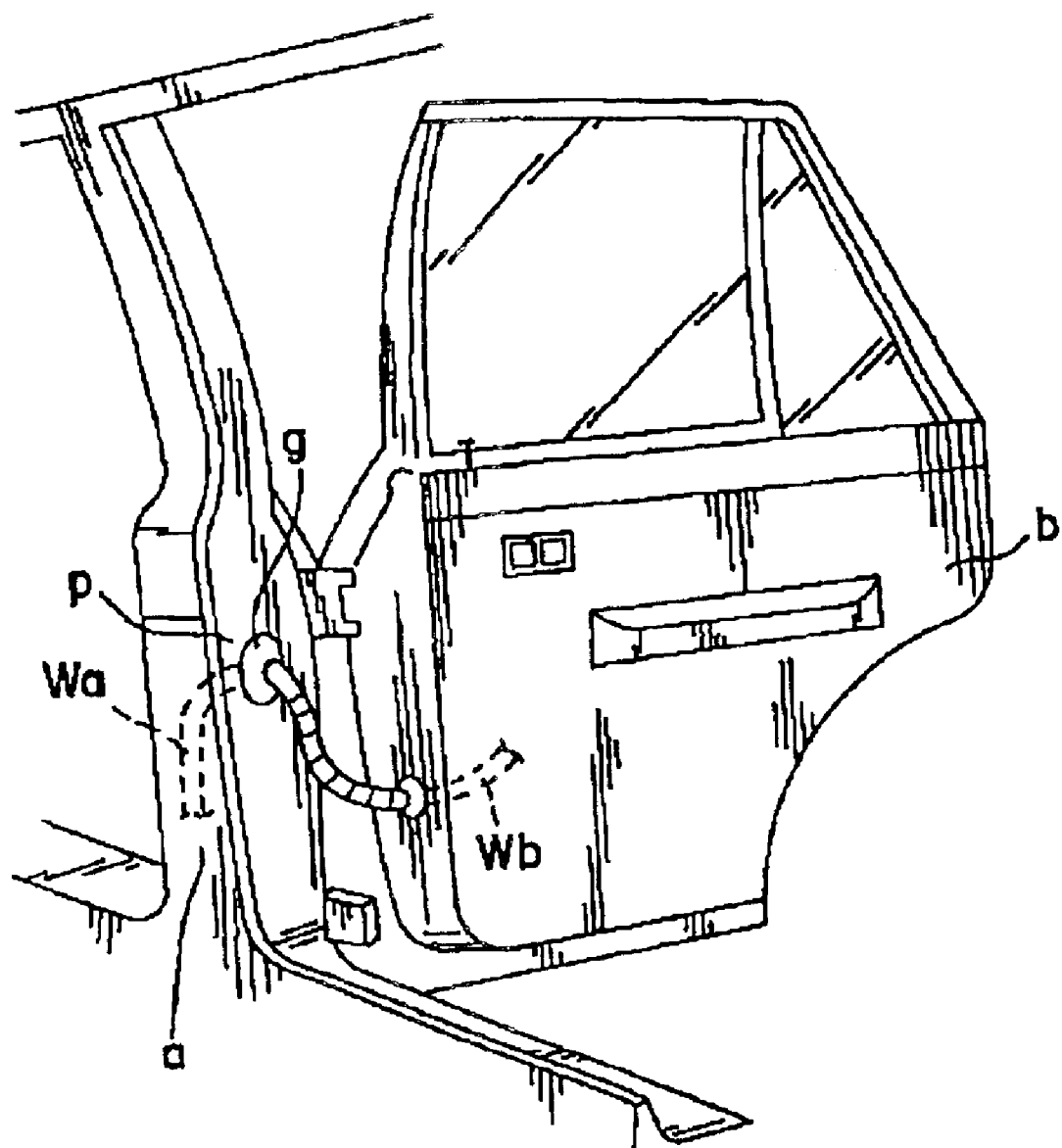
FIG. 1 is a perspective view showing the prior art door portion of a vehicle.
Figure 2:
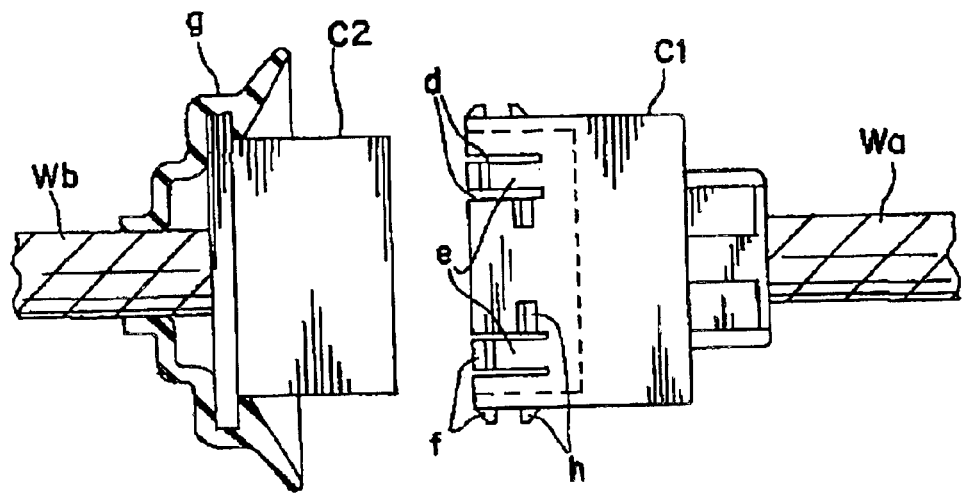
FIG. 2 is a side view showing the state in which prior art connectors are separated.
Figure 3:
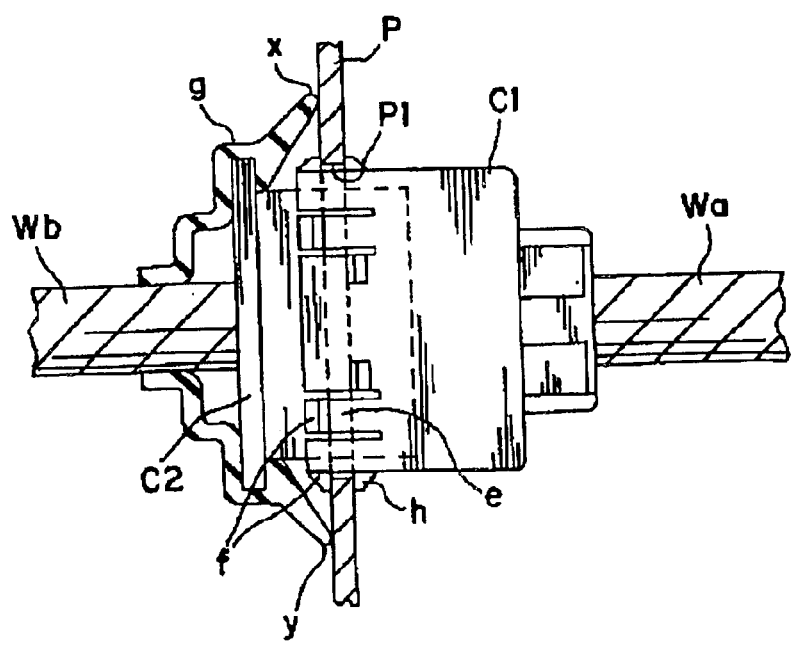
FIG. 3 is a side view showing the state in which the connectors of FIG. 2 are coupled with each other.
Figure 4:
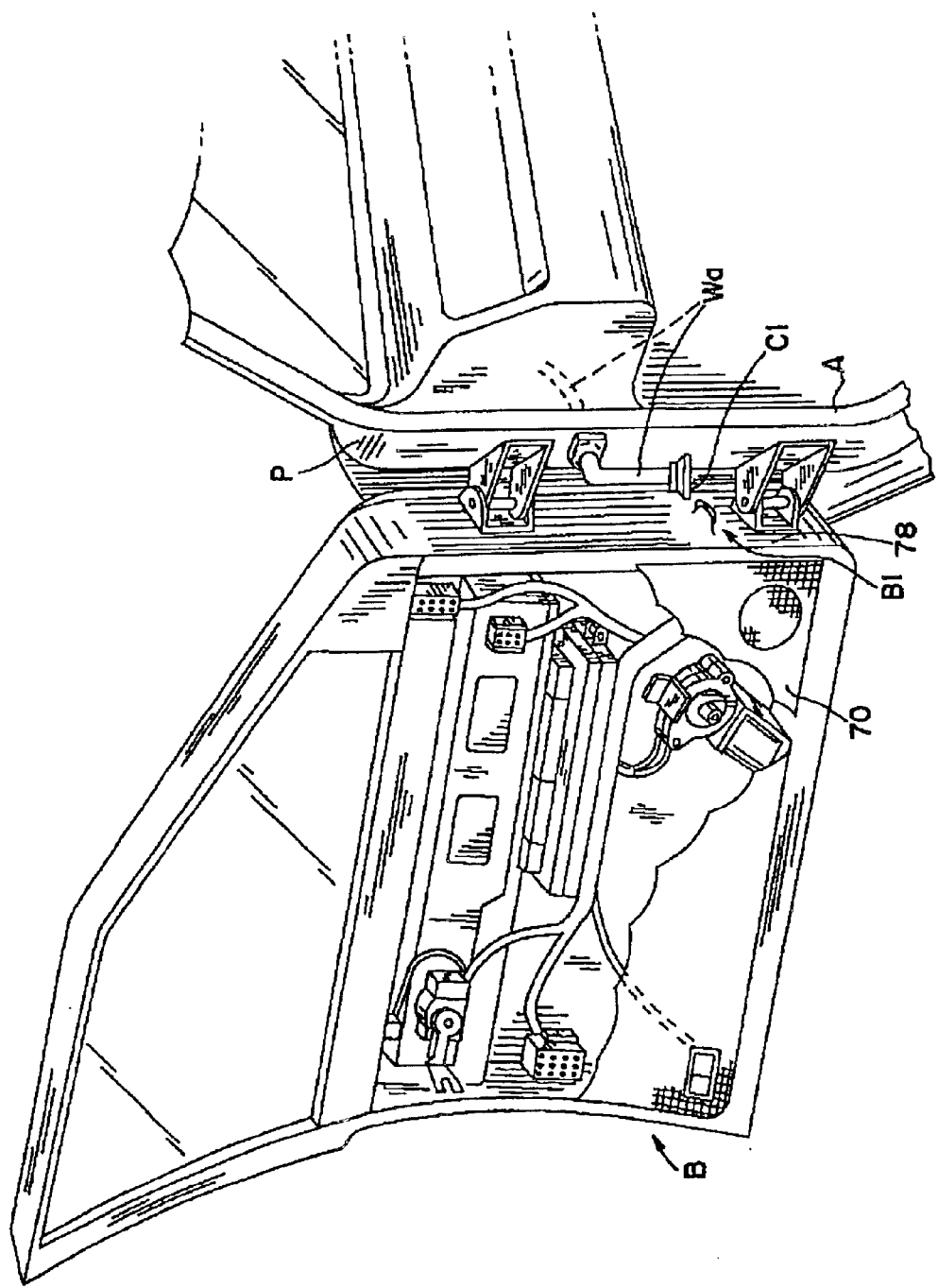
FIG. 4 is a perspective view taken from the interior side of the driver's door with the interior trim panel partially cut away to show typical components contained within the door.

As shown in FIG. 4, reference character B denotes a vehicle member in the form of a door which is fitted to a vehicle body A with hinges and contains a door side wire harness Wb disposed therein. Also as shown in FIG. 4, reference character P denotes another vehicle member in the form of a pillar of vehicle body A which contains a vehicle body side wire harness Wa disposed therein and extended therefrom to be coupled with the door side wire harness Wb by way of a connector at the connector fixing hole B1 formed in the forward lower wall 78 of the housing of door B.

Figure 5:
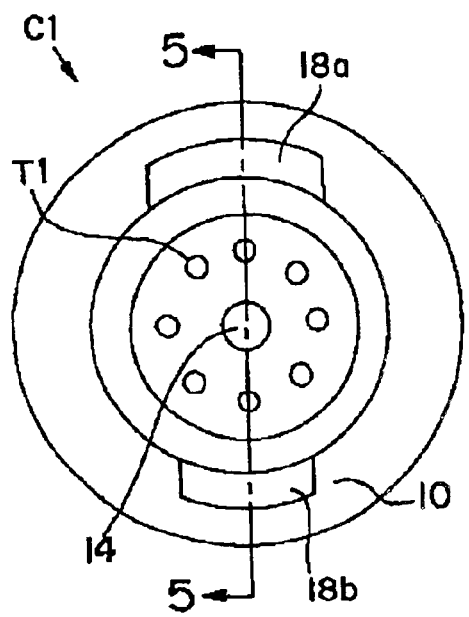
FIG. 5 is a front view of a connector of a vehicle body side wire harness.
Figure 6:
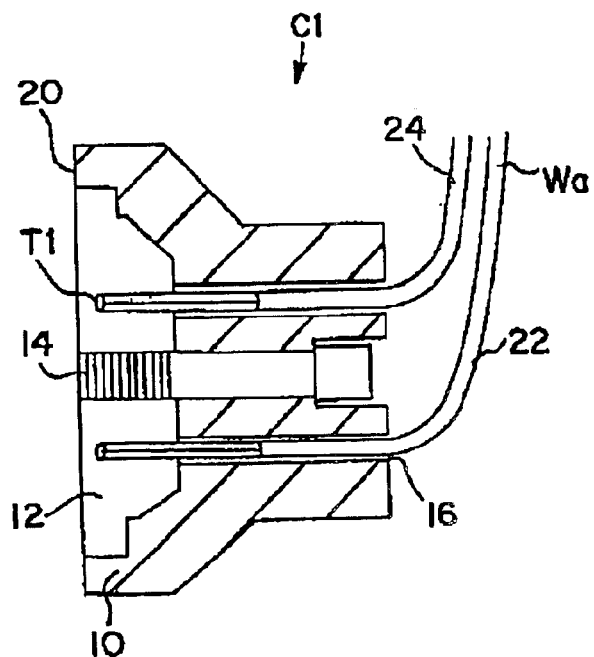
FIG. 6 is a sectional view of FIG. 5 taken along line 5—5.
Figure 7:
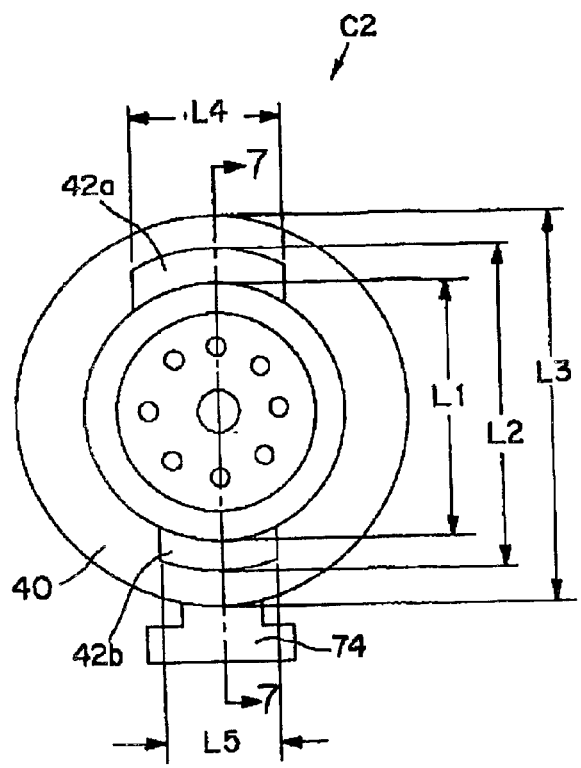
FIG. 7 is a front view of a connector of a door side wire harness.
Figure 8:
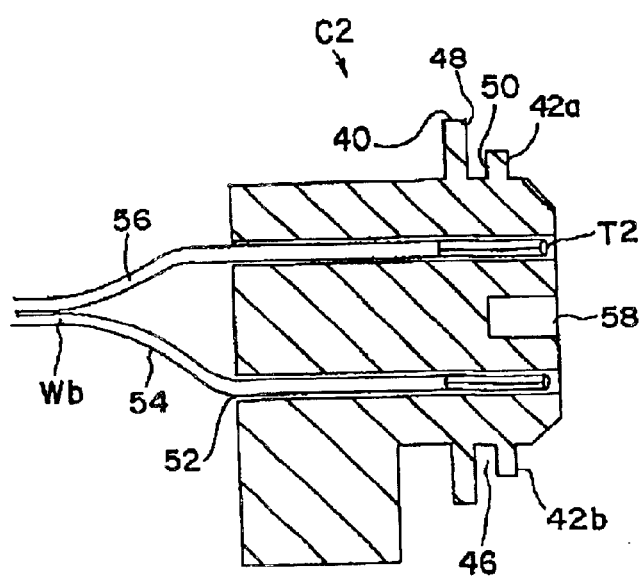
FIG. 8 is a sectional view of FIG. 7 taken along line 7—7.

As shown in FIGS. 5 and 6, reference character C1 denotes a female connector attached to vehicle body side wire harness Wa. As shown in FIGS. 7 and 8, reference character C2 denotes a male connector connected to door, side wire harness Wb. Connectors C1 and C2 are preferably formed from a polymer material and contain, respectively, a plurality of male terminals T1 and female terminals T2. The substantially circular female connector C1 comprises a flange 10 and a recess 12 from which male terminals T1 and a threaded fastener 14 protrude from the bottom surface thereof. Recess 12 comprises keyed portions 18a and 18b which halve different sizes as to allow female connector C1 and male connector C2 to connect in only a one orientation to eliminate the possibility of incorrect alignment upon connection. Female connector C1 also comprises a plurality of chambers 16 which house male terminals T1 and the terminal end portions of wires 22 and 24.

The male connector C2 comprises a first locking piece 40 denoted by a continuous ring as shown in FIG. 7. Male connector C2 further comprises a second locking piece denoted by tabs 42a and 42b, which correspond and fit into keyed portions 18a and 18b, respectively, of female connector C1. First and second locking pieces 40 and 42a and 42b are separated by an undercut region 46 located between first locking piece surface 48 and second locking piece surface 50 with a width therebetween corresponding to the thickness of wall 78 of door B. Male connector C2 also comprises a plurality of chambers 52 which house female terminals T2 and the terminal end portions of wires 54 and 56.

Figure 9:
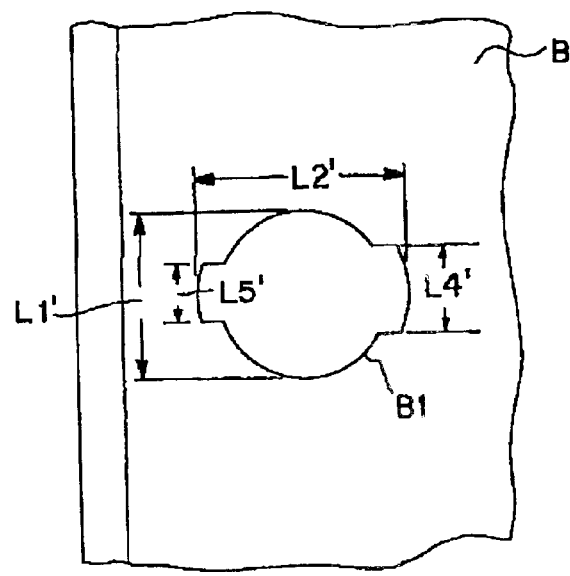
FIG. 9 is a front view of the connector fixing hole located in the door.

With respect to FIGS. 8 and 9, the relationship between the lengths of the male connector C2 and the connector fixing hole B1 are L1'>L1, L2'>L2, LA'>L4 and L5'>L5. Consequently L1, L2, L4 and L5 of male connector C2 may pass through L1', L2', LA' and L5' of connector fixing hole B1, respectively. However, L3 of male connector C2, which is representative of first locking piece 40, does not pass through any corresponding portion of connector fixing hole B1.

With the structure above, the male connector C2 attached to the door side wire harness Wb can partially penetrate through the connector fixing hole B1 from the inner side to the outer side of the wall 78 of door B. The male connector may penetrate through connector fixing hole Bi until first locking piece surface 48 contacts the inner surface 60 of wall 78 of door B. Consequently, a first locking mechanism is created with the engagement of first locking piece surface 48 and the inner surface 60 of wall 78 of door B in the form of a first overlap which prevents male connector C2 from completely passing forward in direction F through connector fixing hole B1.

Once male connector C2 has passed partially through connector fixing hole B1 such that first locking piece surface 48 engages the inner surface 60 of wall 78 of door B, male connector C2 is then further positioned, preferably by rotational adjustment, either clockwise or counter clockwise. For example, preferably, when male connector C2 is rotated 90 degrees, the second locking piece surface 50 contacts outer surface 62 of wall 78 of door B. Consequently a second locking mechanism is created with the engagement of the second locking piece surface 50 and the outer surface 62 of the wall 78 of door in the form of a second overlap which prevents male connector C2 from completely passing rearward in direction R through, connector fixing hole B1. In the above manner, male connector C2 forms a two-way interlock (i.e. forward and rearward) between the overlapping first and second locking pieces 40, 42 and the portion of wall 78 of door B located in the undercut. region 46 therebetween.

Once the male connector C2 is connected to the connector fixing hole B1, the female connector C1 is then connected to the male connector C2. The female connector C1 is preferably connected to the male connector C2 by means of a threaded fastener 14 which engages a recess 58 of the male connector C2. In order to eliminate the possibility of incorrect alignment upon connection, female connector C2 and male connector C1 are preferably designed to connect only in one correct orientation. As such, recess 12 of female connector C1 comprises different sized keyed portions 18a and 18b which correspond to tabs 42a and 42b, respectively.

When female connector C1 is connected to male connector C2, tabs 42a and 42b enter keyed portions 18a and 18b of recess 12. During the rotation of threaded fastener 14 into final coupling, the interlock between tabs 42a, 42b and keyed portions 18a, 18b also prevents stress from being applied directly to terminals T1 and T2 and thus minimizes and possibility of damage during assembly. When the female connector is coupled to male connector C2, outer surface 20 of flange 10 seals against the outer surface 62 of wall 78 of door B. In other embodiments outer surface 20 of flange B may include a sealing ring or other type of gasket which functions as a waterproof seal.

Figure 10:
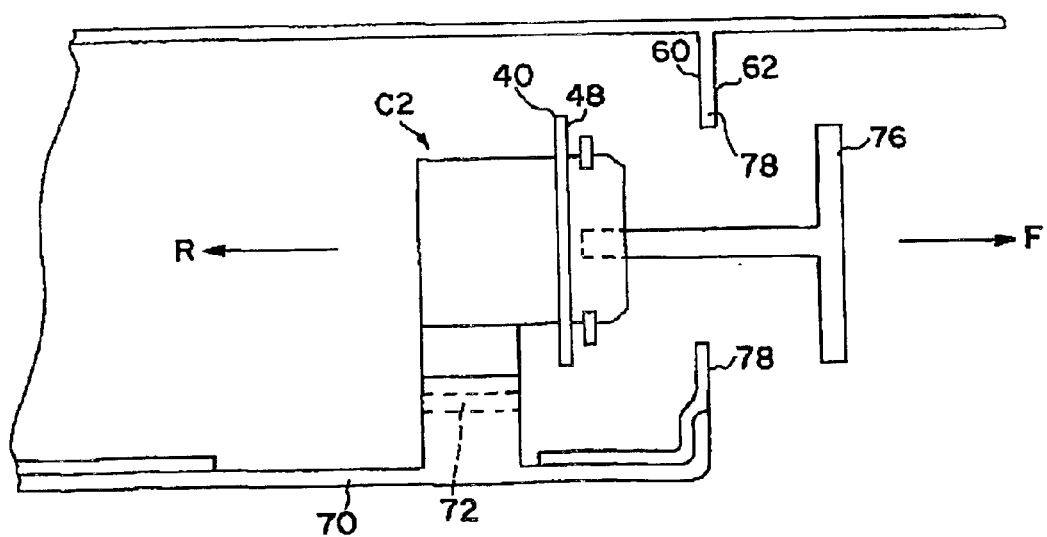
FIG. 10 is a partial, top sectional view of the door taken through the center of the connector fixing hole after assembly of an interior trim panel and before connection of the connectors.
Figure 11:
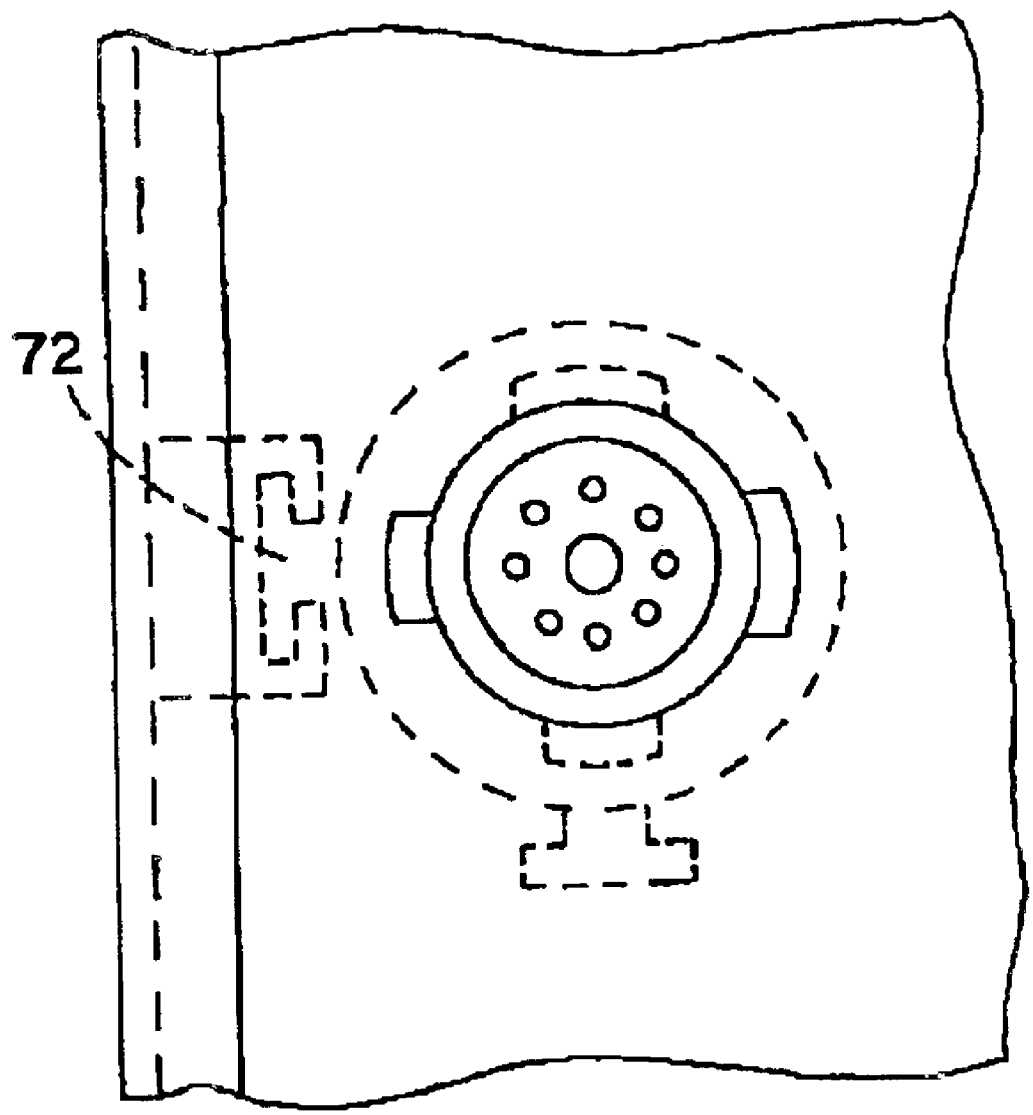
FIG. 11 is a front view of the connector fixing hole after installation of the interior trim panel and the door side wire harness.

In order to promote more efficient assembly of door B, male connector C2 is preferably temporarily connected at a fixed location within the confines of the door B to temporary holding structure. Preferably, the temporary holding structure is located on interior door trim panel 70. As shown in FIGS. 10 and 11, interior trim panel 70 includes a temporary holding structure in the form of a receptacle 72 for holding base, 74 of male connector C2. As shown, receptacle 72 of trim panel 70 and base 74 of male connector C2 comprise a mating T-shaped structure.

After assembly of interior door trim panel 70 to door B, male connector C2 is preferably removed from receptacle 72 of trim panel 70 by a connector tool 76 by first inserting a portion of the connector tool 76 in the direction R through connector fixing hole B1 and into engagement with recess 58 of the male connector C2. Upon engagement, connector tool 76 is then moved in the direction F through connector fixing hole B1 to slide base 74 of male connector C2 from receptacle 72 of trim panel 70. Once base 74 is removed from receptacle 72, connector tool 76 continues to move in the direction F until first locking piece surface 48 contacts the inner surface 60 of wall 78 of door B, at which point male connector C2 is connected to door B to form a two-way interlock, as discussed above.

In addition, directions R and F above correspond herein to what can be described as the perpendicular direction relative to the positioning and engagement of the male connector C2 in connector fixing hole B1. As therefore can be appreciated in the context of the present invention, male connector C2, when inserted and engaged in connector fixing hole B1, as herein described, is prevented from general perpendicular removal from the connector fixing hole B1.

In addition, as will be appreciated herein, the connector fixing hole herein can be placed anywhere on the vehicle body to facilitate coupling to the connector described herein. In such fashion, the connector C2 described herein containing first and second locking pieces and region therebetween can be releasably engaged at any desired location in the vehicle to facilitate its coupling to other connectors in the vehicle body. For example, the structure for coupling two mating connectors at the connector fixing hole formed in the vehicle door comprises a first connector attached to a first wire harness, a second connector attached to a second wire harness, and a wall provided within a vehicle for fixing the first connector to a connector fixing hole in said vehicle wall. The first connector-comprises a first locking piece and a second locking piece and a region therebetween, wherein the first locking piece and the second locking piece are-attached to the first connector and engage a portion of the vehicle wall in the region-between said first and second locking piece of said first connector. Preferably, said first and second locking piece do not deflect when engaging a portion of said vehicle wall.

By not deflecting, it is contemplated herein that the first and second locking pieces are made sufficiently rigid such that, they releasably engage the vehicle, without any significant permanent deformation. Along such lines, a variety, of engineering thermoplastic materials are suitable for preparation of the connector herein, such as polycarbonate, polysulphone, polyacetal, acrylonitrile-butadiene-styrene, nylon, and polyester type material. The connector herein may therefore be readily injection molded from such resins, or known equivalents thereof. In addition, along such lines, glass-filled type materials may be employed, as the glass reinforcement contributes to the strength of the thermoplastic resin of which they are incorporated. In addition, the connector herein can also be manufactured from thermoset materials, such as epoxy, polyurethane, and/or polyester resin based formulations, through such techniques as compression molding, or reaction injection molding, as the case may be.

Having now fully described the invention, it will be apparent to one of ordinary skill in the art that many changes and modifications can be made thereto without departing from the spirit and scope of the invention as set forth herein.

What is claimed is:

1. A method for coupling a first connector containing a first end with a second connector containing a keyed portion, the method comprising the steps of:

inserting a first end of the first connector forwardly through a fixing hole disposed in a member said member including inner and outer surfaces, the first connector comprising a first locking piece including a first locking piece surface, a second locking piece including a second locking piece surface, and an undercut region disposed there between, the second locking piece sized to fit through the fixing hole and the first locking piece sized so as not to fit through the fixing hole;

rotating the first connector relative to the member, thereby interlocking the first locking piece surface with the inner surface of the member and the second locking piece surface with the outer surface of the member to prevent forward and rearward movement of said connector relative to said member and without substantial deflection of either of the first locking piece or the second locking piece;

aligning the keyed portion of the second connector with the second locking piece of the first connector; and applying a force to the second connector to cause the first connector and the second connector to become coupled together.

2. The method according to claim 1 further, wherein the step of inserting the first end of the first connector through the fixing hole, comprises the step of inserting the first end of the first connector through a non-circular fixing hole.

3. The method according to claim 1 wherein the step of applying a force to the second connector comprises the step of rotating a threaded fastener inserted through the second connector and into the first connector.

4. The method according to claim 1, wherein the step of rotating the first connector relative to the member prevents movement of the first connector in a direction perpendicular to a surface of the member.

5. The method according to claim 1, wherein the step of inserting the connector into the fixing hole follows a step of coupling wire to the connector.

6. A connector system, comprising:

a first connector comprising a first locking piece including a first locking piece surface, a second locking piece including a second locking piece surface, and an undercut region disposed there between, the second locking piece sized to fit through a fixing hole in a member, the member including inner and outer surfaces and the first locking piece sized so as to not fit through the fixing hole, wherein the first connector is rotated relative to the fixing hole in the member thereby interlocking the first locking piece surface with the inner surface of the member and second locking piece surface with the outer surface of the member to prevent forward and rearward movement of said connector relative to said member without substantial deflection of either of the first locking piece or the second locking piece;

a second connector coupleable to the first connector, the second connector comprising a keyed portion alignable and engages with the second locking piece of the first connector.

7. The connector system of claim 6, wherein the second connector further comprising a threaded fastener, rotation of the threaded fastener reducing the distance between the fist connector and the second connector.

8. The connector system according to claim 6, wherein the first connector and the second connector are configured to be coupled, and thereby retain the second connector to the first connector in the fixing hole.

9. The connector system according to claim 6, wherein the second locking piece comprises at least two radially extending opposing tabs.

* * * * *